(12) United States Patent
Asano

(10) Patent No.: US 7,091,630 B2
(45) Date of Patent: Aug. 15, 2006

(54) DEVICE AND METHOD FOR INHIBITING POWER FLUCTUATION

(75) Inventor: Shigetaka Asano, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 503 days.

(21) Appl. No.: 10/294,581

(22) Filed: Nov. 15, 2002

(65) Prior Publication Data

US 2003/0169605 A1    Sep. 11, 2003

(30) Foreign Application Priority Data

Mar. 5, 2002    (JP)    ............................. 2002-059351

(51) Int. Cl.
*H02J 3/00*    (2006.01)
*H02J 1/04*    (2006.01)

(52) U.S. Cl. ......................................... 307/34; 307/33

(58) Field of Classification Search .................. 307/33, 307/34
See application file for complete search history.

(56) References Cited

U.S. PATENT DOCUMENTS 5,349,523 A * 9/1994 Inou et al. .................... 363/97

6,252,384 B1 * 6/2001 Arai et al. .................... 323/282

FOREIGN PATENT DOCUMENTS

| JP | 10-090370 | 4/1998 |
|----|-----------|--------|
| JP | 11-055947 | 2/1999 |

* cited by examiner

*Primary Examiner*—Brian Sircus
*Assistant Examiner*—Hal I. Kaplan
(74) *Attorney, Agent, or Firm*—Arent Fox PLLC

(57) ABSTRACT

A device for inhibiting power supply voltage fluctuation that is caused by fluctuation of a load current generated by a load circuit. The device includes a current consumption circuit, a data generation circuit, and a D/A converter. The current consumption circuit is connected to a power supply and the load circuit to generate a consumption current that flows parallel to the load current of the load circuit. The data generation circuit controls the consumption current of the current consumption circuit in order to inhibit fluctuation of an output current of the power supply, which is the sum of the load current and the consumption current, when the load current rises and when the consumption current falls. The D/A converter converts the digital signal to an analog signal and provides the analog signal to the current consumption circuit.

18 Claims, 14 Drawing Sheets

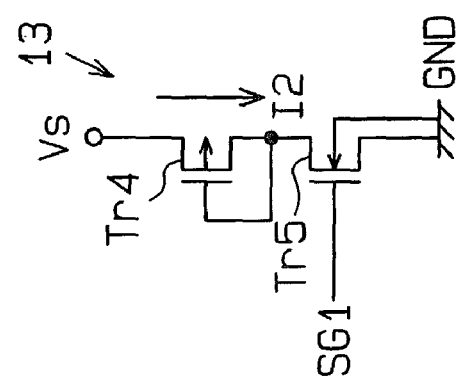
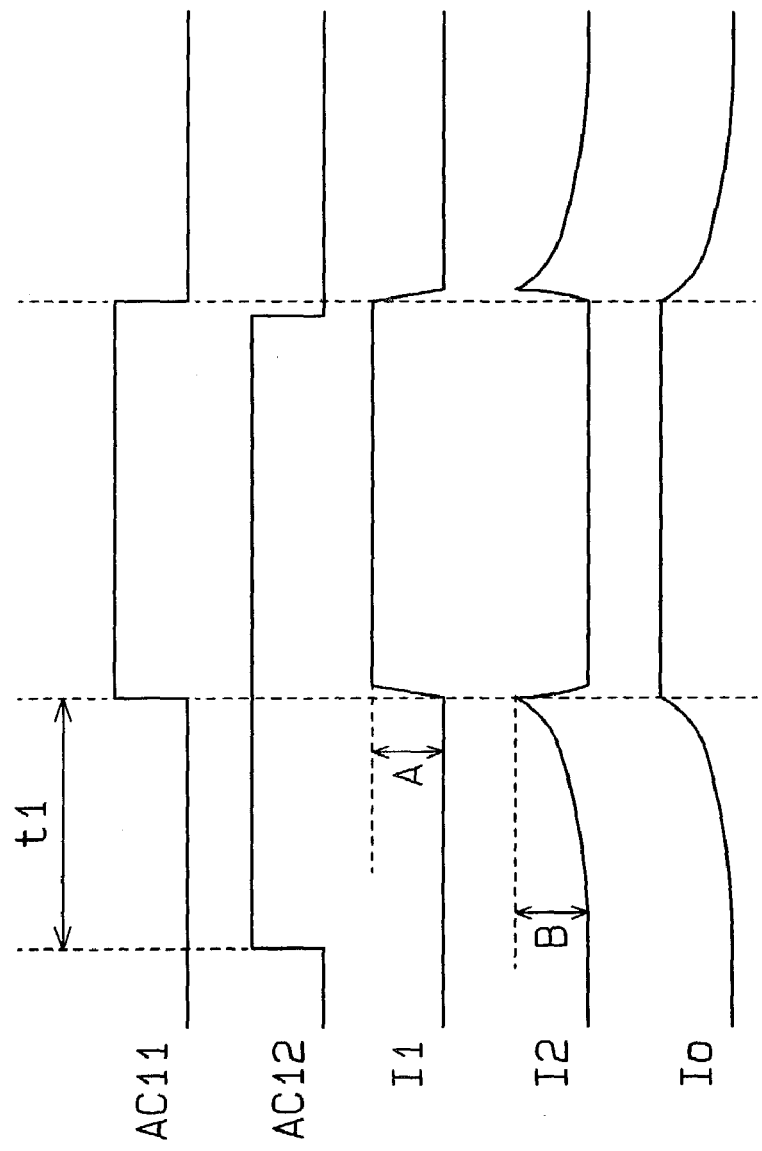

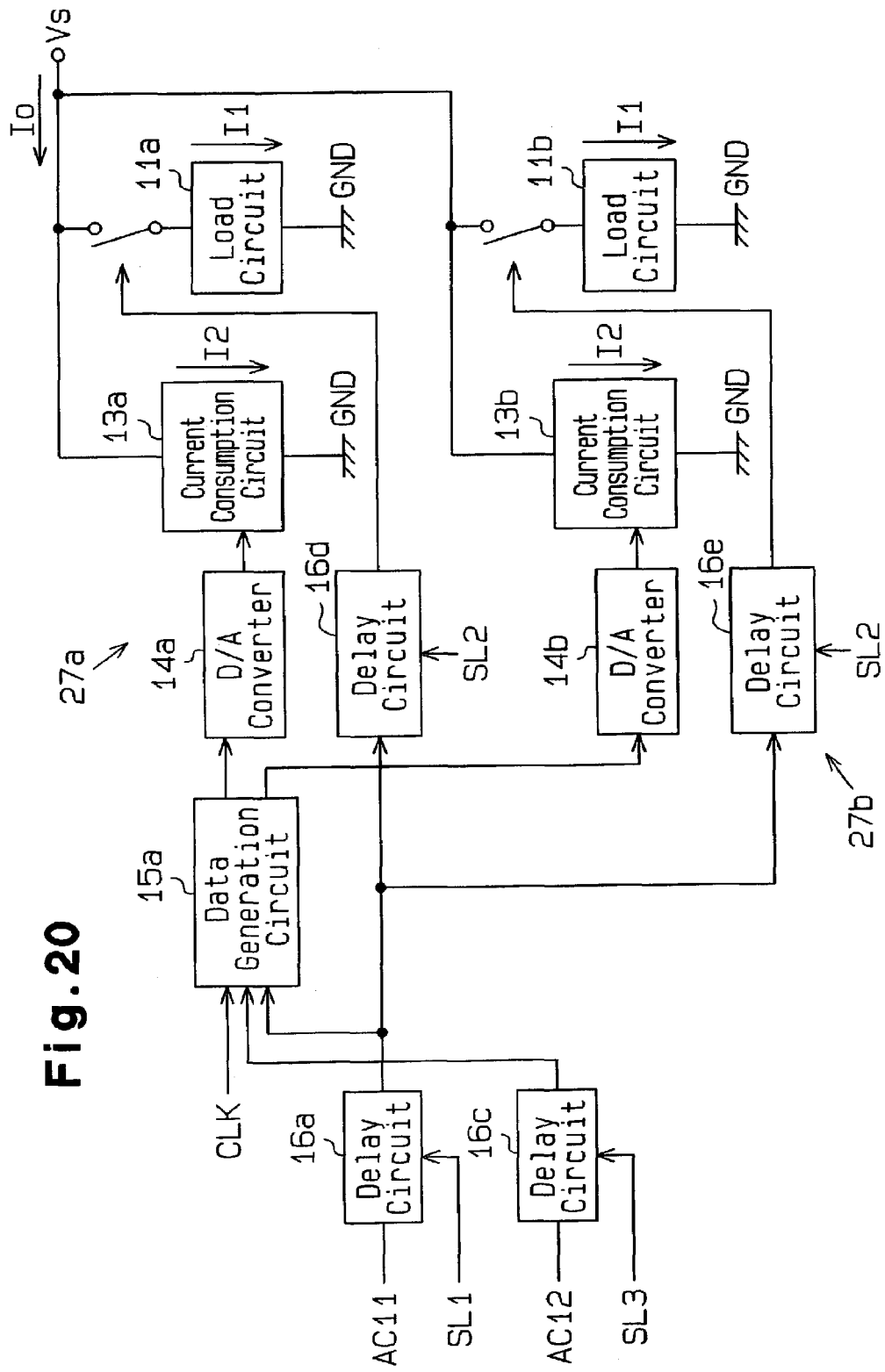

DEVICE AND METHOD FOR INHIBITING POWER FLUCTUATION

This application is based upon and claims the benefit of priority of Japanese Patent Application No. 2002-059351, filed on Mar. 5, 2002, the contents being incorporated herein by reference.

BACKGROUND OF THE INVENTION

The present invention relates to a power fluctuation inhibiting device, and more particularly, to a power fluctuation inhibiting device for suppressing fluctuation of power supply voltage in a semiconductor device.

Semiconductor devices incorporated in recent portable electronic equipment are configured to function in a power down mode in order to reduce power consumption. Internal circuits stop operating during the power down mode to reduce power consumption. In a conventional semiconductor device, the load applied to the power supply fluctuates when the semiconductor device shifts between the power down mode and a normal mode. This causes the power supply voltage to fluctuate. Such power fluctuation may result in erroneous functioning of circuits. Thus, the fluctuation of power supply voltage must be inhibited.

Japanese Laid-Open Patent Publication No. 11-55947 describes a power supply device that supplies power to an air conditioner. In accordance with fluctuations in the load applied to the air conditioner, which functions as a load circuit, the power supply device inhibits power fluctuation by opening and closing a switch of a converter circuit. However, the power supply device cannot sufficiently follow complicated load fluctuations. Accordingly, even if the technical concept of the power supply device is applied to a semiconductor device, power fluctuations cannot be inhibited by following load fluctuations of multiple load circuits.

Japanese Laid-Open Patent Publication No. 10-90370 describes a technology that detects the operation rate of a pulse generation circuit, which functions as a load circuit of a power supply, and operates a current consumption circuit based on fluctuations in the operation rate to reduce transient current. However, it is difficult to match the timing at which the operating rate of the pulse generation circuit fluctuates with the timing for operating the current consumption circuit. It is also difficult to offset the fluctuated amount of the current consumed by the pulse generation circuit with the value of the current consumed by the current consumption circuit.

Accordingly, deviation of the operating timing of the current consumption circuit or an inappropriate value of the current consumed by the current consumption circuit may result in power fluctuation.

FIG. 1 illustrates power fluctuations that occur when activating and inactivating internal circuits in a prior art semiconductor device. For example, when multiple analog circuits start to operate as a first control signal CS1 goes low, the power supply voltage Vs fluctuates.

The power supply voltage Vs also fluctuates when multiple digital circuits start to operate as a second control signal CS2 goes high. Further, when the first and second control signals CS1, CS2 synchronously inactivate the analog and digital circuits, the power supply voltage Vs fluctuates.

FIG. 2 is a block circuit diagram showing a prior art device that inhibits fluctuation of the power supply voltage Vs. As shown in FIG. 2, the power supply voltage Vs is supplied to two load circuits 1a, 1b via switch circuits 2a, 2b, respectively. An activation signal AC1 opens and closes a switch circuit 2a. The delay circuit 3 delays an activation signal AC1 to generate an activation signal AC2 that opens and closes the switch circuit 2b. The load circuits 1a, 1b are activated and inactivated in an asynchronous manner. This inhibits fluctuation of the power supply voltage Vs.

FIG. 3 illustrates a specific example of the load circuit shown in FIG. 2. The load circuit is a current mirror circuit that includes transistors Tr1–Tr3. When a switch circuit 4a goes on and a switch circuit 4b goes off, the transistors Tr1, Tr2 function as a current mirror circuit. When the switch circuit 4a and a switch circuit 4c go on and a switch circuit 4d goes off, the transistors Tr2, Tr3 function as a current mirror circuit.

The switch circuit 4a receives an activation signal AC3. The switch circuit 4c receives an activation signal AC4, which is generated by delaying the activation signal AC3 with a delay circuit 5a. The switch circuit 4b receives an activation signal AC5, which is generated by inverting the activation signal AC3 with an inverter circuit 6. The switch circuit 4d receives an activation signal AC6, which is generated by delaying the activation signal AC5 with a delay circuit 5b.

The switch circuit 4c goes on after the switch circuit 4a goes on. Thus, the transistors TR2, TR3 start to function as a current mirror circuit after the transistors Tr1, Tr2 start to function as a current mirror circuit. To inactivate the current mirror circuits, after inactivating the switch circuit 4a and activating the switch circuit 4b, the switch circuit 4c is inactivated and the switch circuit 4d is activated.

Accordingly, after the transistors Tr1, Tr2 stop functioning as a current mirror circuit, the transistors Tr2, Tr3 stop functioning as a current mirror circuit. The transistors Tr1, Tr2 and the transistors Tr2, Tr3 are activated and inactivated in an asynchronous manner. Thus, fluctuation of the power supply voltage is inhibited.

In the circuit of FIG. 3, the switch circuits 4a–4d are especially required to offset the operating timing of the current mirror circuits. However, the switch circuits 4a, 4c may especially fluctuate the gate voltage of the transistors Tr1, Tr3. Thus, when the current mirror circuit requires accuracy, the switch circuits 4a–4d cannot be employed.

SUMMARY OF THE INVENTION

It is an object of the present invention to provide a device that inhibits fluctuations of a power supply voltage when a load current fluctuates.

To achieve the above object, the present invention provides a device connected to a power supply and a load circuit to inhibit power supply voltage fluctuation that is caused by fluctuation of a load current generated by the load circuit. The device includes a current consumption circuit connected to the power supply and the load circuit to generate a consumption current that flows parallel to the load current of the load circuit. A current control circuit is connected to the current consumption circuit to control the consumption current of the current consumption circuit in order to inhibit fluctuation of an output current of the power supply, which is the sum of the load current and the consumption current, when the load current rises and falls.

A further perspective of the present invention is a device connected to a power supply and a load circuit to inhibit power supply voltage fluctuation that is caused by fluctuation of a load current generated by the load circuit. The device includes a current consumption circuit connected to the power supply and the load circuit to generate a consumption current that flows parallel to the load current of the load circuit. A data generation circuit generates a digital signal that controls the consumption current of the current consumption circuit in order to inhibit fluctuation of an output current of the power supply, which is the sum of the load current and the consumption current, when the load current rises and falls. A D/A converter is connected to the data generation circuit and the current consumption circuit to convert the digital signal to an analog signal and provide the analog signal to the current consumption circuit.

A further perspective of the present invention is a semiconductor device including a plurality of load circuits, and a plurality of power fluctuation inhibiting devices, each connected to an associated one of the load circuits to inhibit power supply voltage fluctuation that is caused by fluctuation of a load current generated by the associated load circuit. Each of the power fluctuation inhibiting devices includes a current consumption circuit connected parallel to the associated load circuit and arranged near the load circuit to generate a consumption current that flows parallel to a load current generated by the associated load circuit. A current control circuit is connected to the current consumption circuit to control the consumption current of the current consumption circuit in order to inhibit fluctuation of an output current of the power supply, which is the sum of the load current and the consumption current, when the load current rises and falls. The current control circuit generates a digital signal that causes the consumption current to fall in synchronism with the rising of the load current and causes the consumption current to rise in synchronism with the falling of the load current.

A further perspective of the present invention is a semiconductor device including a plurality of load circuits, and a plurality of power fluctuation inhibiting devices, each connected to an associated one of the load circuits to inhibit power supply voltage fluctuation that is caused by fluctuation of a load current generated by the associated load circuit. Each of the power fluctuation inhibiting devices includes a current consumption circuit connected parallel to the associated load circuit and arranged near the load circuit to generate a consumption current that flows parallel to a load current generated by the associated load circuit. A data generation circuit is used commonly by the power fluctuation inhibiting devices to generate a digital signal that controls the current consumption circuit in order to inhibit fluctuation of an output current of the power supply when the load current rises and falls. A D/A converter is connected to the data generation circuit and the current consumption circuit to convert the digital signal to an analog signal and provide the analog signal to the associated current consumption circuit. The data generation circuit generates the digital signal for causing the consumption current to fall in synchronism with the rising of the load current, and generates the digital signal for causing the consumption current to rise in synchronism with the falling of the load current.

A further perspective of the present invention is a method for inhibiting power supply voltage fluctuation that is caused by fluctuation of a load current generated by a load circuit. The load circuit is connected to a current consumption circuit for generating a consumption current that flows parallel to the load current of the load circuit. The method includes the steps of causing the consumption current of the current consumption circuit to gradually rise before the load current of the load circuit rises, causing the consumption current to fall in synchronism with the rising of the load current, causing the consumption current to rise in synchronism with the falling of the load current, and causing the consumption current to gradually fall.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a timing waveform chart illustrating the operation of the power fluctuation inhibiting device of FIG. 4;

FIG. 6 is a circuit diagram of a current consumption circuit incorporated in the power fluctuation inhibiting device of FIG. 4;

FIG. 20 is a schematic block circuit diagram of the semiconductor device of FIG. 19.

DETAILED DESCRIPTION OF THE PREFERRED EMBODIMENTS

Figure 1:
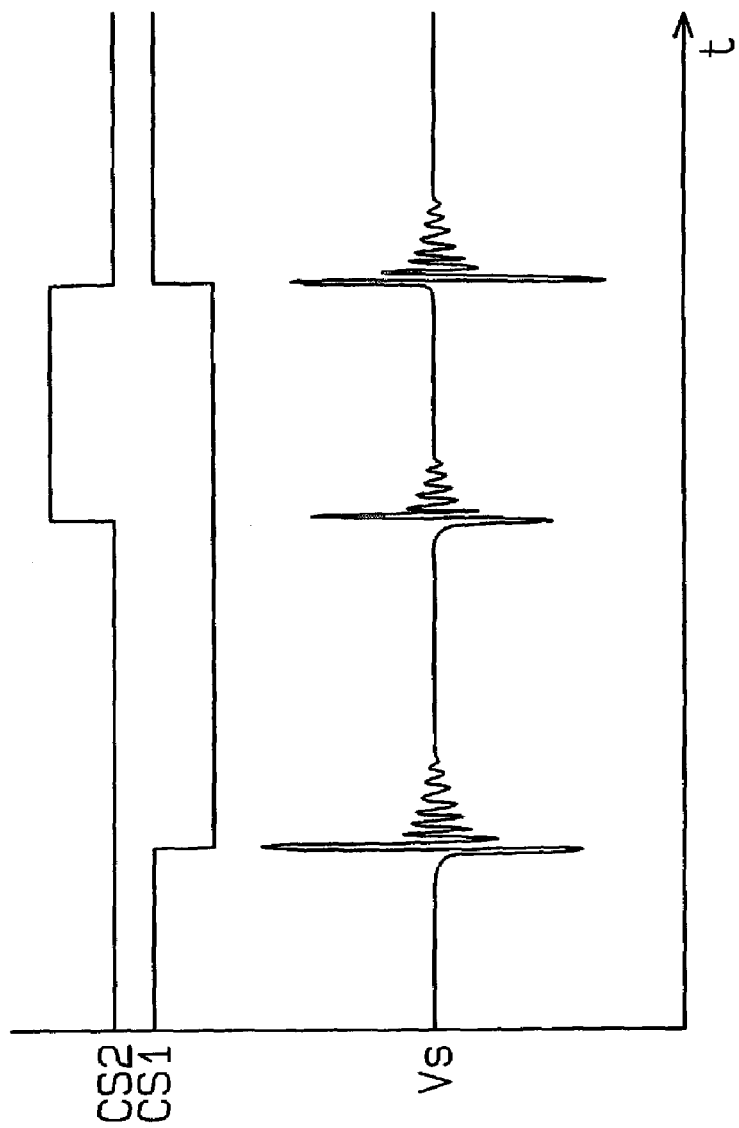
FIG. 1 is a waveform diagram illustrating the operation of a prior art power fluctuation inhibiting device.
Figure 2:
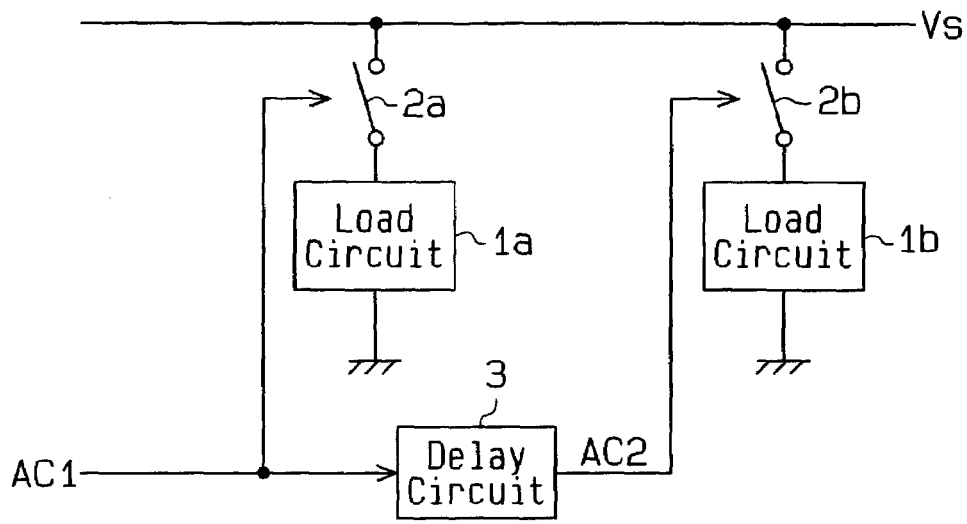
FIG. 2 is a schematic block diagram of a prior art power fluctuation inhibiting device.

In the drawings, like numerals are used for like elements throughout.

Figure 4:
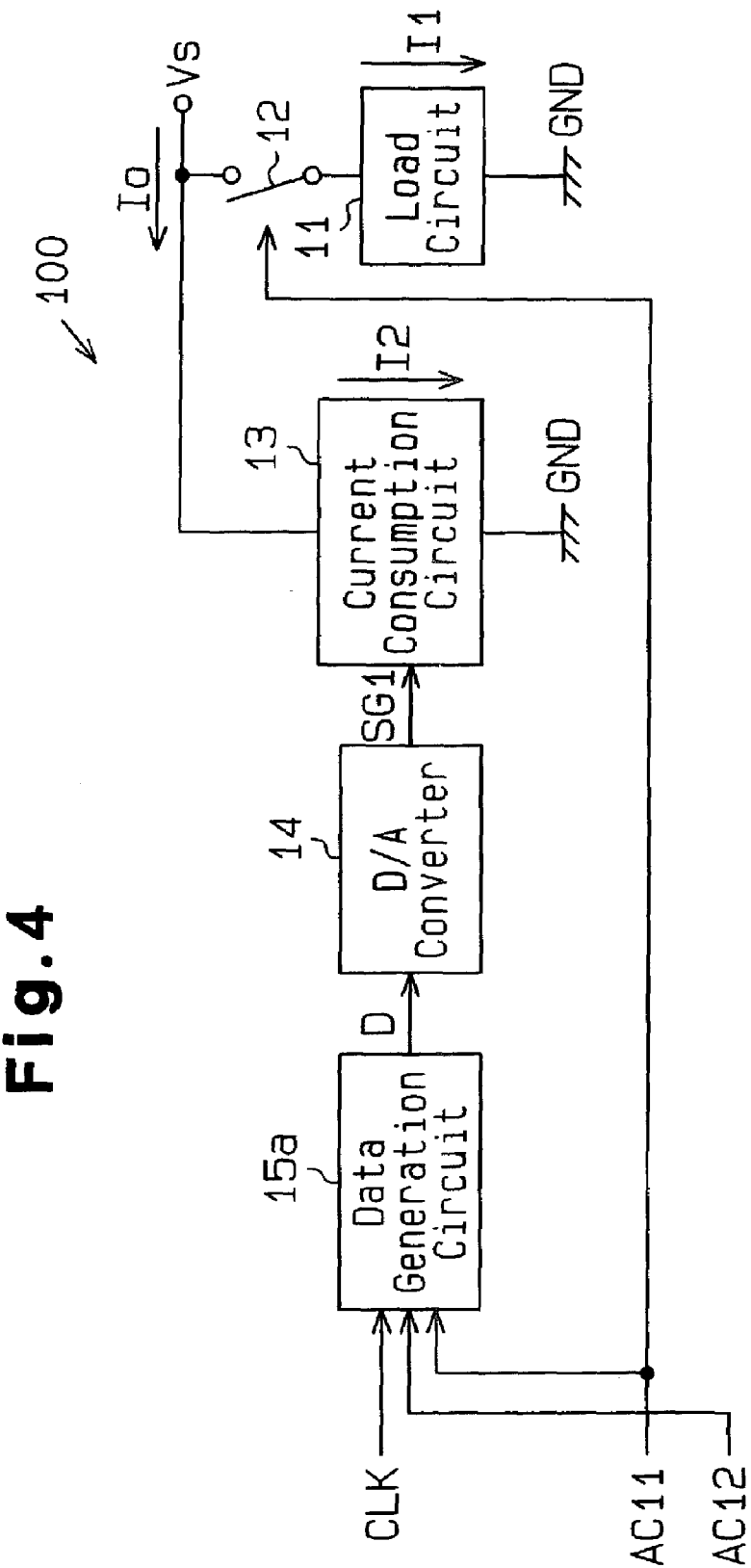
FIG. 4 is a schematic block circuit diagram of a power fluctuation inhibiting device according to a first embodiment of the present invention.

FIG. 4 is a schematic block circuit diagram of a power fluctuation inhibiting device 100 according to a first embodiment of the present invention. A load circuit 11, which is a digital circuit or an analog circuit, is supplied with power supply voltage Vs via a switch circuit 12. The switch circuit 12 is provided with a first activation signal AC11.

When the load circuit 11 is functioning normally and the first activation signal AC11 goes high, the switch circuit 12 goes on. In this state, the load circuit 11, which is supplied with the power supply voltage Vs, consumes load current I1. When the load circuit 11 is in the power mode, the first activation signal AC11 goes low, and the low first activation signal AC11 inactivates the switch circuit 12. In this state, the supply of the power supply voltage Vs to the load circuit 11 is stopped.

Figure 3:
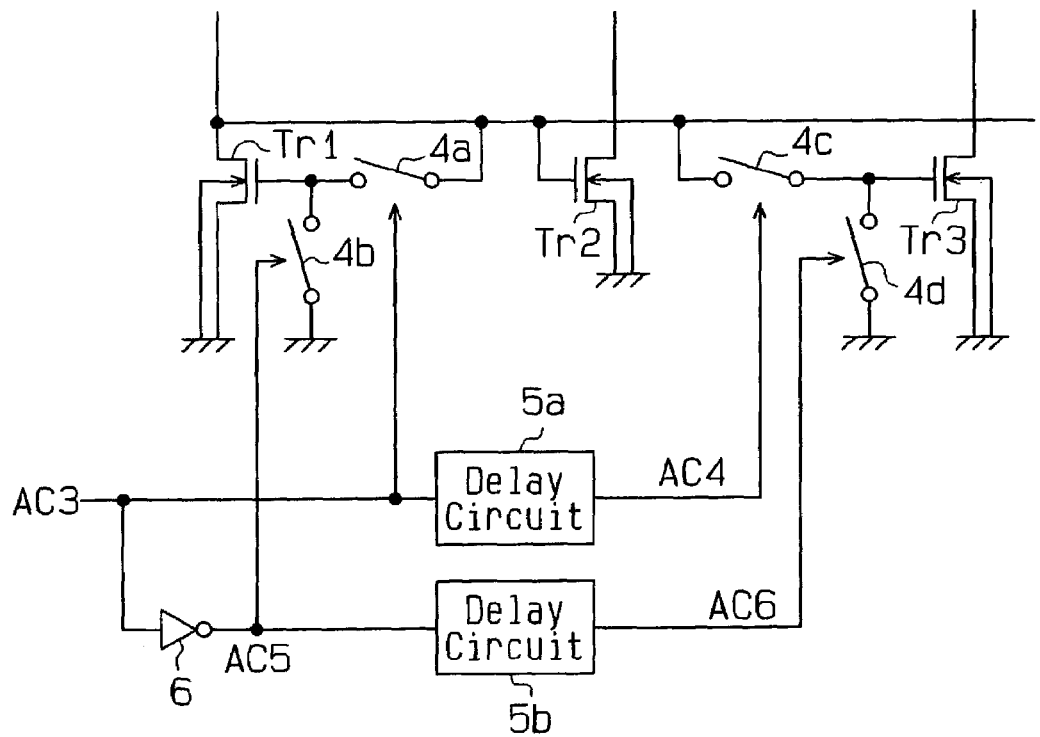
FIG. 3 is a circuit diagram of a prior art load circuit.

When the load circuit 11 is an analog circuit, the load circuit 11 includes a current mirror circuit, such as that shown in FIG. 3, and the switch circuit 12 corresponds to the switch circuits 4a–4d of FIG. 3.

When the load circuit 11 is a digital circuit, the switch circuit 12 may be controlled by whether or not a clock signal, for example, is provided to the switch circuit 12 as the first activation signal AC11.

A current consumption circuit 13 inhibits fluctuations of the power supply voltage Vs, which results from fluctuation of the load current I1 flowing through the load circuit, in accordance with an analog signal SG1 provided from a D/A converter.

FIG. 6 is a specific circuit diagram of the current consumption circuit 13. The source of a p-channel MOS transistor Tr4, which is connected to a diode (not shown), is supplied with the power supply voltage Vs. The gate and drain of the transistor Tr4 are connected to the drain of the n-channel MOS transistor Tr5.

The source of the transistor Tr5 is connected to the ground GND. The gate of the transistor Tr5 is provided with an analog signal SG1 from a D/A converter (current control circuit) 14. When the voltage of the analog signal SG1 increases, the consumption current I2 of the current consumption circuit 13 increases.

The output current (hereafter, referred to as power supply current) Io of the power supply Vs is the sum of the load current I1 and the consumption current I2, which is consumed by the current consumption circuit 13.

The first activation signal AC11 is provided to a data generation circuit (current control circuit) 15a. The data generation circuit 15a is provided with a second activation signal AC12 and the clock signal CLK. The first and second activation signals AC11, AC12 are provided from a controlling section (not shown) that controls the operation of the load circuit 11. As shown in FIG. 5, the second activation signal AC12 goes high before the first activation signal AC11 goes high and goes low slightly before the first activation signal AC11 goes low.

The data generation circuit 15a generates a digital signal D, which is synthesized by a register transfer level (RTL) and which controls the consumption current I2 of the current consumption circuit 13. Then, the data generation circuit 15a provides the digital signal D to the D/A converter 14. The D/A converter 14 converts the digital signal D to the analog signal SG1.

The operation of the data generation circuit 15a will now be described with reference to the flowchart of FIG. 7.

Figure 7:
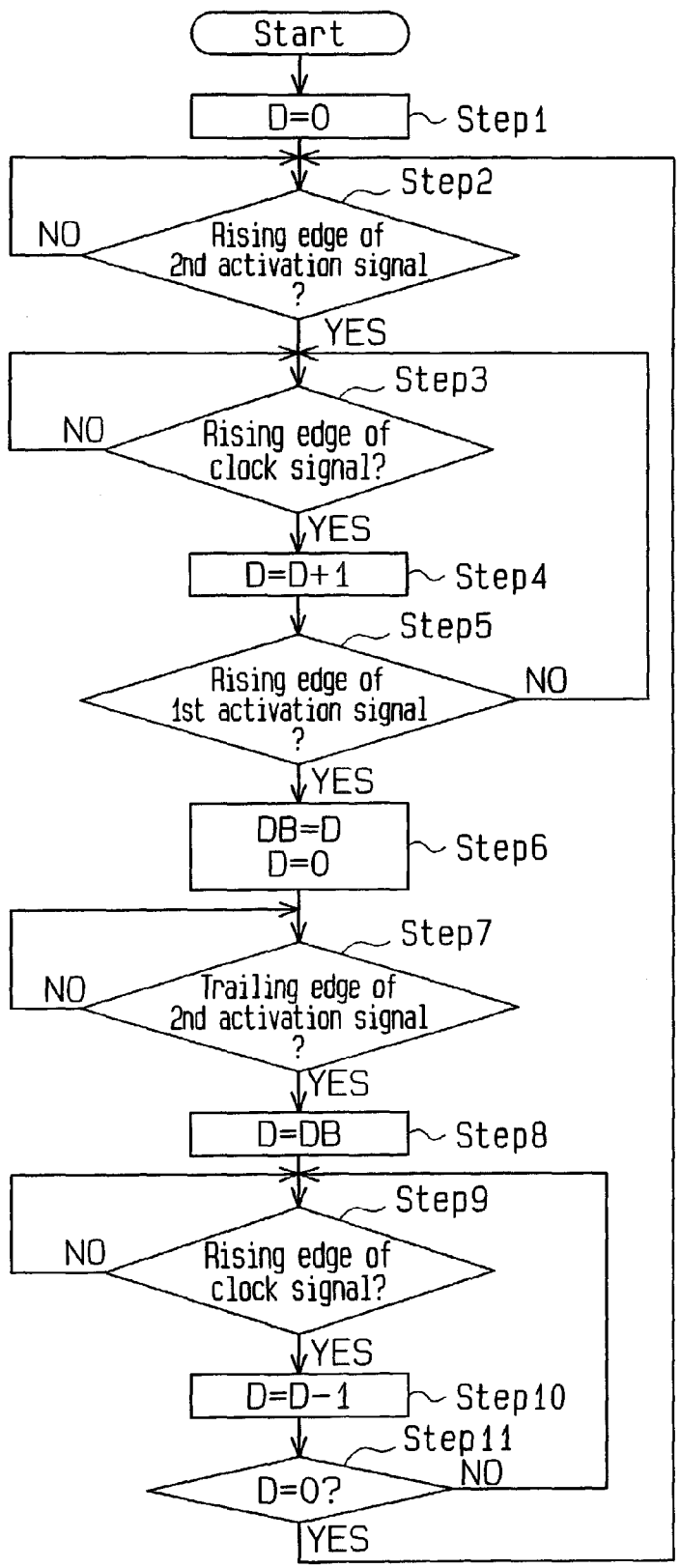
FIG. 7 is a flowchart illustrating the operation of a data generation circuit incorporated in the power fluctuation inhibiting device of FIG. 4.

As shown in FIG. 7, when the data generation circuit 15a starts to operate, the data generation circuit 15a initializes the digital signal D to "0" (step 1).

Then, when the data generation circuit 15a detects the rising edge of the second activation signal AC12 (step 2), the data generation circuit 15a adds "1" to the digital signal D when the clock signal CLK goes high (steps 3, 4).

The voltage of the analog signal SG1 of the D/A converter 14 gradually increases in accordance with the digital signal D. As the analog signal SG1 increases, the consumption current I2 of the current consumption circuit 13 gradually increases as shown in FIG. 5. As the consumption current I2 increases, the power supply current Io gradually increases.

Then, when the data generation circuit 15a detects the rising edge of the first activation signal AC11 (step 5), the data generation circuit 15a resets the digital signal D to "0" (step 6) after temporarily holding the value of the digital signal D as a stored value DB. In this state, the load circuit 11 is activated in accordance with the rising edge of the activation signal AC11, and the load current I1 increases to a predetermined value, as shown in FIG. 5.

In this state, the digital signal D is reset at "0", and the consumption current I2 of the current consumption circuit 13 decreases to "0". The rising of the load current I1 coincides with the falling of the consumption current I2 of the current consumption circuit 13. The power supply current Io gradually increases until the first activation signal AC11 goes high and then coincides with the load current I1 and becomes the constant current.

Then, when the data generation circuit 15a detects the trailing edge of the second activation signal AC12 (step 7), the data generation circuit 15a sets the stored value DB in the digital signal D (step 8). As a result, the consumption current I2 of the current consumption circuit 13 increases to the level when the first activation signal AC11 goes high.

Immediately afterward, when the first activation signal AC11 goes low, the load circuit 11 is inactivated and the load current I1 decreases to "0".

Then, the data generation circuit 15a subtracts "1" from the digital signal D whenever the clock signal CLK goes high and repeats the subtraction until the digital signal D becomes "0" (steps 9 to 11).

As a result, as shown in FIG. 5, the consumption current I2 gradually decreases. As the consumption current I2 gradually decreases, the power supply current Io gradually decreases. When the digital signal D decreases to "0", the data generation circuit 15a returns to step 2 and waits until the second activation signal AC12 goes high again.

It is preferred that the constant current value A of the load current I1 of the load circuit 11, which is shown in FIG. 5, coincide with the maximum value B of the consumption current I2 of the current consumption circuit 13.

The time t1 from when the second activation signal AC12 goes high to when the first activation signal AC11 goes high is set at the time required for the consumption current I2 to be equal with the constant current value A of the load current I1 when the first activation signal AC11 goes high.

The power fluctuation inhibiting device 100 of the first embodiment has the advantages described below.

(1) Prior to the rising of the load current I1, the current consumption circuit 13 gradually increases the power supply current Io. When the load current I1 decreases, the consumption current I2 of the current consumption circuit 13 goes low. Accordingly, the power supply current Io is prevented from suddenly changing when the load current I1 goes high, and fluctuation of the power supply voltage Vs is inhibited.

(2) When the load current I1 goes low, the consumption current I2 of the current consumption circuit 13 goes high and then the consumption current I2 gradually decreases. Thus, the power supply current Io gradually decreases. Accordingly, the power supply current Io is prevented from suddenly changing when the load current I1 goes low, and fluctuation of the power supply voltage Vs is inhibited.

(3) The rising of the load current I1 and the falling of the consumption current I2 of the current consumption circuit 13 is based on the rising edge of the same first activation signal AC11. Accordingly, the timings of the rising of the load current I1 and the falling of the consumption current I2 are easily synchronized.

(4) The load current I1 goes low when the first activation signal AC11 goes low, and the consumption current I2 goes high when the second activation signal AC12 goes low. The second activation signal AC12 goes low at substantially the same time as when the first activation signal AC11 goes low. Accordingly, the timings of the falling of the load current I1 and the rising of the consumption current I2 are easily synchronized. The rising of the consumption current I2 is slightly delayed from the falling of the second activation signal AC12. It is thus preferred that the second activation signal AC12 goes low slightly before the first activation signal AC11 goes low.

(5) The consumption current I2 of the current consumption circuit 13 is generated in accordance with the digital signal D. Accordingly, the desired consumption current I2, which is in accordance with the load current I1, is accurately generated.

Figure 8:
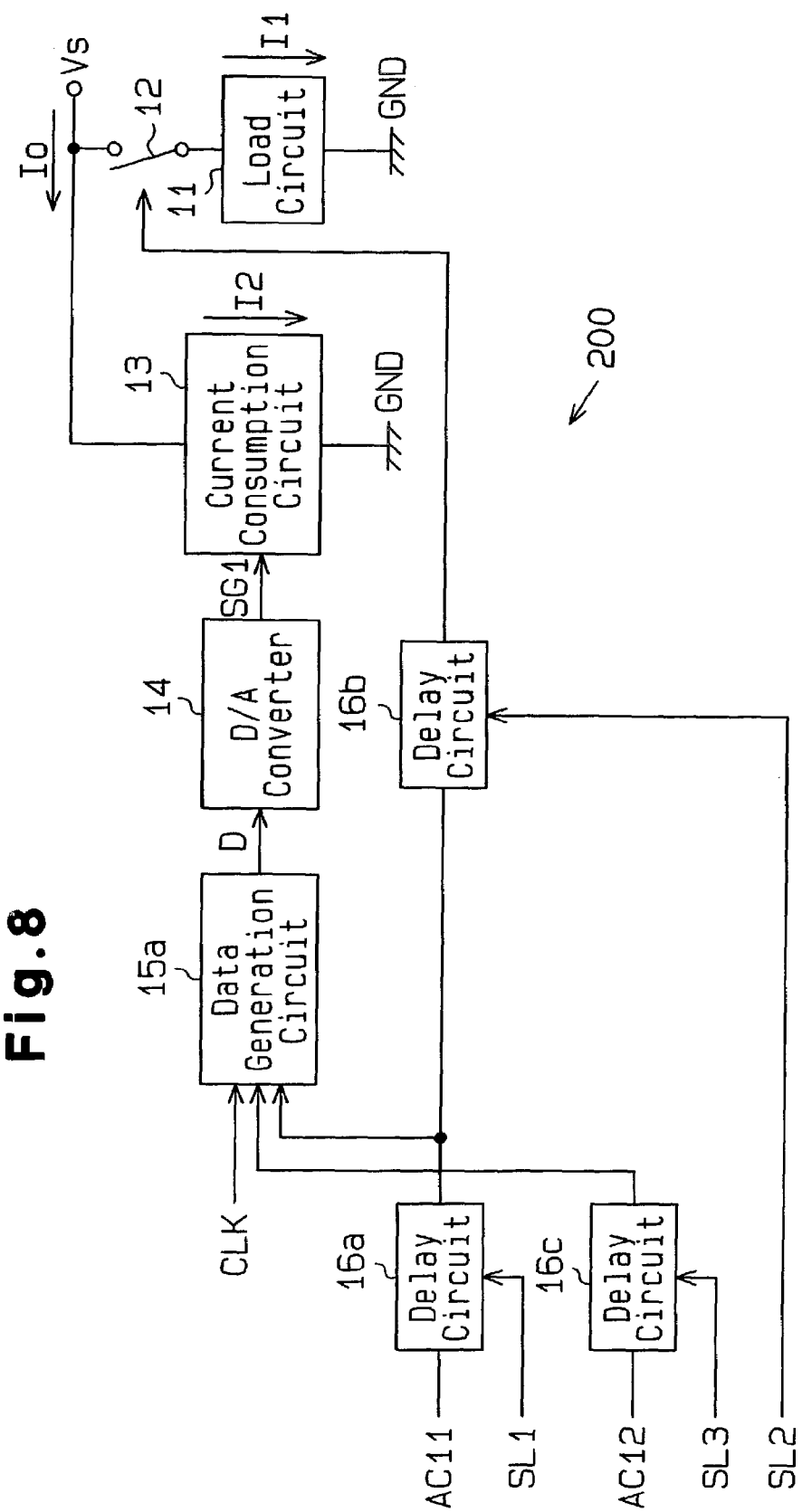
FIG. 8 is a schematic block circuit diagram of a power fluctuation inhibiting device according to a second embodiment of the present invention.

FIG. 8 is a schematic block circuit diagram of a power fluctuation inhibiting device 200 according to a second embodiment of the present invention. The power fluctuation inhibiting device 200 is configured by adding first to third delay circuits 16a–16c to the power fluctuation inhibiting device 100 of the first embodiment. The remaining parts are substantially the same as the power fluctuation inhibiting device 100 of the first embodiment.

The first activation signal AC11 is provided to the data generation circuit 15a via the first delay circuit 16a. The first activation signal AC11 is also provided to the switch circuit 12 via the first and second delay circuits 16a, 16b. The second activation signal AC12 is provided to the data generation circuit 15a via the third delay circuit 16c.

Figure 9:
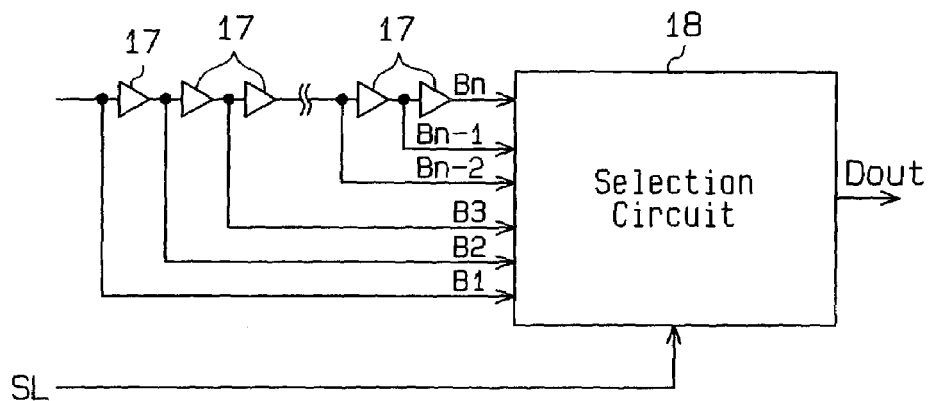
FIG. 9 is a schematic block diagram of a delay circuit incorporated in the power fluctuation inhibiting device of FIG. 8.

As shown in FIG. 9, the first to third delay circuits 16a–16c include a plurality of series-connected buffer circuits 17 and a selection circuit 18. The buffer output signals B1–Bn of the buffer circuits 17 are input to the selection circuit 18.

The selection circuit 18 of the first to third delay circuits 16a–16c is provided with selection signals SL1–SL3. In accordance with the associated selection signal SL1–SL3, the selection circuit 18 selects one of the buffer output signals B1–Bn and outputs the delay output signal Dout as the selected buffer output signal. Accordingly, the delay circuits 16a–16c select the proper delay times in accordance with the selection signals SL1–SL3.

In the power fluctuation inhibiting device 200, by selecting the proper delay time of the first delay circuit 16a, the timing at which the consumption current I2 of the current consumption circuit 13 falls is adjusted in correspondence with the rising edge of the first activation signal AC11.

Further, by selecting the proper delay time of the second delay circuit 16b, the delay time from when the consumption current I2 falls to when the load current I1 rises is adjusted. Thus, the timing at which the consumption current I2 falls and the load current I1 rises is appropriately adjusted, and the power supply current is gradually changed when the load current I1 rises.

By selecting the proper delay time of the third delay circuit 16c, the timing at which the consumption current I2 rises relative to the falling of the load current I1 is adjusted. Accordingly, when the load current I1 falls, the power supply current Io changes gradually.

In addition to the advantages of the first embodiment, the power fluctuation inhibiting device 200 of the second embodiment has the advantages described below.

(1) The timings of the rising of the load current I1 and the falling of the consumption current I2 are appropriately adjusted to inhibit sudden fluctuation of the power supply current Io. Accordingly, the fluctuation of the power supply voltage Vs is inhibited.

(2) The timings of the falling of the load current I1 and the rising of the consumption current I2 are appropriately adjusted to inhibit sudden fluctuation of the power supply current Io. Accordingly, the fluctuation of the power supply voltage Vs is inhibited.

Figure 10:
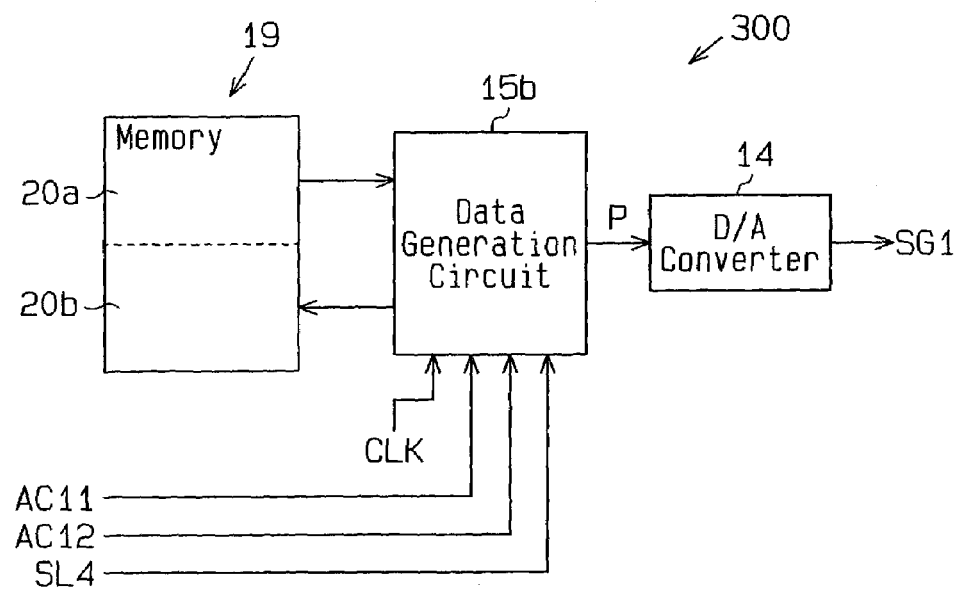
FIG. 10 is a schematic partial block circuit diagram of a power fluctuation inhibiting device according to a third embodiment of the present invention.

FIG. 10 is a schematic partial block circuit diagram of a power fluctuation inhibiting device 300 according to a third embodiment of the present invention. The constant current value A of the load current I1 shown in FIG. 5 fluctuates due to differences in the manufacturing process. The third embodiment absorbs differences in the constant current A. Except for the data generation circuit 15b, the configuration of the third embodiment is substantially the same as the power fluctuation inhibiting device 100 of the first embodiment.

The data generation circuit 15b is connected to a memory 19, which has storage sections 20a, 20b. Data groups for setting the consumption current I2 of the current consumption circuit 13 are stored in each of the storage sections 20a, 20b.

The data generation circuit 15b receives the first and second activation signals AC11, AC12, the clock signal CLK, and the selection signal SL4. The data generation circuit 15b selects one of the storage sections 20a, 20b in accordance with the selection signal SL4 to update addresses in accordance with the clock signal CLK. The data generation circuit 15b sequentially reads data, which corresponds to each address, from the selected storage section and provides the read data as the digital signal D to the D/A converter 14.

Figure 11:
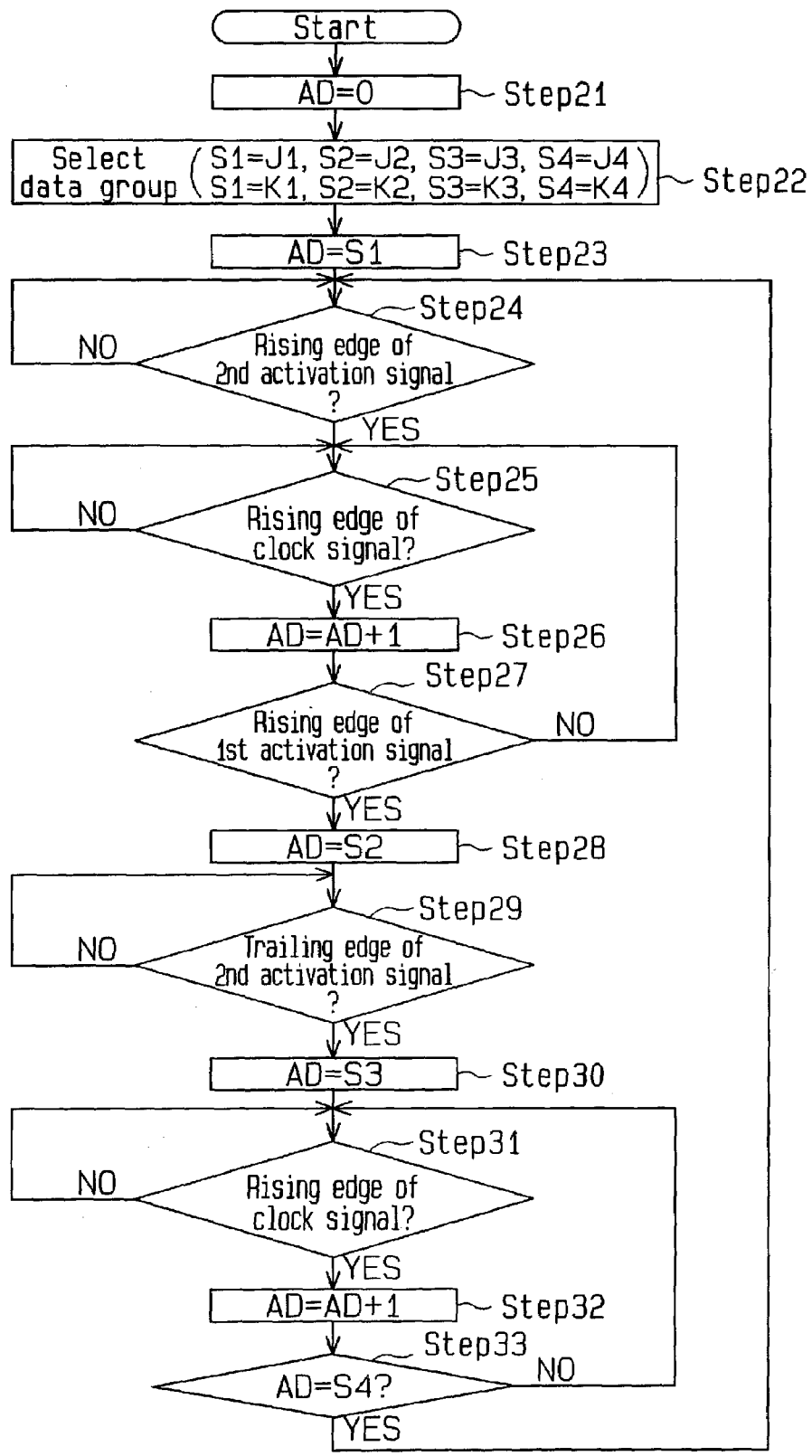
FIG. 11 is a flowchart illustrating the operation of a data generation circuit incorporated in the power fluctuation inhibiting device of FIG. 10.

The operation of the data generation circuit 15b will now be discussed with reference to the flowchart of FIG. 11.

When the data generation circuit 15b starts operating, the data generation circuit 15b initializes the address value AD to "0" (step 21).

Then, the data generation circuit 15b determines the data group that is to be read from one of the storage sections in accordance with the selection signal SL4 (step 22). The data group of the storage section 20a is S1=J1 to S4=J4 and other data, and the data group of the storage section 20b is S1=K1 to S4=K4 and other data. S1 to S4 represent address values, and J1 to J4 and K1 to K4 represent data stored at the addresses.

The data generation circuit 15b sets the address value AD as S1, reads the data stored at address S1 (for example, J1), and outputs the data J1 as the digital signal D (step 23).

When the data generation circuit 15b detects the rising edge of the second activation signal AC12 (step 24), the data generation circuit 15b adds "1" to the address value AD when the clock signal CLK goes high (steps 25, 26).

The data generation circuit 15b continues to add "1" to the address value AD when the clock signal CLK goes high until detecting the rising edge of the first activation signal AC11 (steps 25–27) and outputs the data read from the address as the signal D.

In accordance with the digital signal D of the data generation circuit 15b, the voltage of the analog signal SG1 of the D/A converter 14 gradually increases. As the voltage of the analog signal SG1 increases, the consumption current I2 of the current consumption circuit 13 gradually increases, as shown in FIG. 5. The increase in the consumption current I2 gradually increases the power supply current Io.

Then, when the data generation circuit 15b detects the rising edge of the first activation signal AC11 (step 27), the data generation circuit 15b sets the address value AD at S2. The data generation circuit 15b reads data J2, which is stored at address S2, and outputs the data J2 as the digital signal D. The consumption current I2 is set to "0" in accordance with the data J2.

When the data generation circuit 15b detects the trailing edge of the second activation signal AC12 (step 29), the data generation circuit 15b determines the address value AD (step 30). The data generation circuit 15b reads data J3, which is stored at address S3, and outputs the data J3 as the digital signal D. The consumption current I2 is increased to the maximum value B in accordance with the data J3.

When the data generation circuit 15b detects the rising edge of the clock signal CLK (step 31), the data generation circuit 15b adds "1" to the address value AD and outputs the data corresponding to the added address as the digital signal D (step 32). The data generation circuit 15b repeats steps 32, 33 until the address value AD reaches S4 (steps 31–33).

In accordance with the data of the address, the consumption current I2 of the current consumption circuit 13 gradually decreases. As the consumption current I2 decreases, the power supply current Io gradually decreases. When the address value AD is S4, the data J4 changes the consumption current I2 to "0" and the power supply current Io becomes "0". The data generation circuit 15b returns to step 24 and waits until the second activation signal AC12 goes high again.

In the third embodiment, the inclination of the increase in the consumption current I2 is adjusted so that the maximum value B of the consumption current I2 coincides with the constant current value A when the consumption current I2 is increased before the first activation signal AC11 goes high.

After the second activation signal AC12 goes low, the consumption current I2 is increased to the constant current value A of the load current I1. Then, the consumption current I2 gradually decreases.

In addition to the advantages of the first embodiment, the power fluctuation inhibiting device 300 of the third embodiment has the following advantages.

The digital signal D of the data generation circuit 15b is adjusted to coincide the constant current A of the load current I1 with the maximum value B of the consumption current I2.

Figure 12:
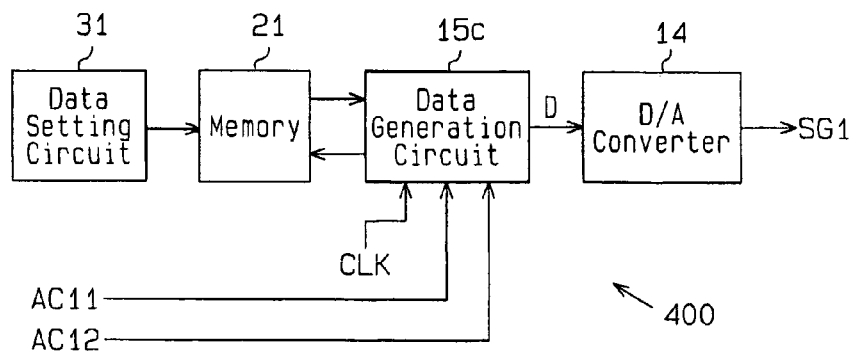
FIG. 12 is a schematic partial block circuit diagram of a power fluctuation inhibiting device according to a fourth embodiment of the present invention.

FIG. 12 is a schematic partial block circuit diagram of a power fluctuation inhibiting device 400 according to a fourth embodiment of the present invention. In the fourth embodiment, the optimal data for setting the consumption current I2 of the current consumption circuit 13 is set in a memory 21 from an external device. The other parts are substantially the same as the power fluctuation inhibiting device 300 of the third embodiment.

The data generation circuit 15c is connected to a memory 21, which is, for example, a flash memory. The memory 21 stores data for setting the consumption current I2 of the current consumption circuit 13. The data generation circuit 15c is provided with the first and second activation signals AC11, AC12 and the clock signal CLK.

The data generation circuit 15c updates the address in accordance with the clock signal CLK and sequentially reads data corresponding to each address from the memory 21. The read data is provided as the digital signal D to the D/A converter 14.

Figure 13:
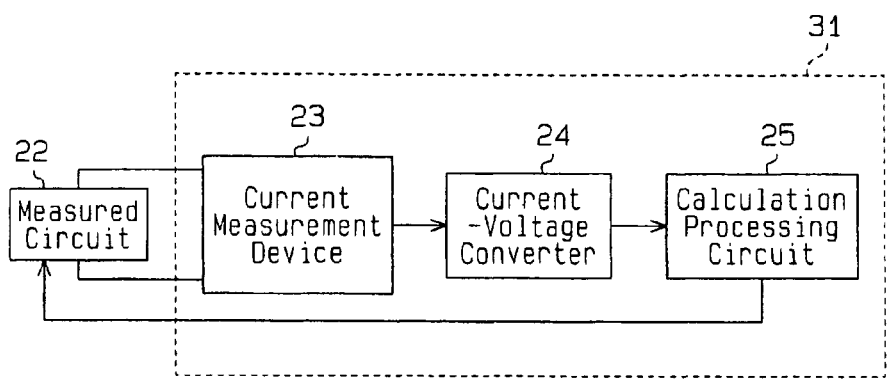
FIG. 13 is a schematic block diagram of a data setting circuit incorporated in the power fluctuation inhibiting device of FIG. 12.

The data stored in the memory 21 is set based on the measurement result of the power supply voltage Vs fluctuation so that the voltage fluctuation decreases. FIG. 13 shows an example of a setting circuit 31, which measures the fluctuation of the power supply voltage Vs (FIG. 8) and generates the data that is to be stored in the memory 21 (FIG. 12) based on the measurement result.

A measured circuit 22 is a power fluctuation inhibiting device that includes a load circuit 11 (FIG. 8). A current measurement device 23 detects and measures the power supply current Io. The current value detected and measured by the current measurement device 23 is converted to a voltage by a current-voltage converter 24 and is supplied to a calculation processing circuit 25. The calculation processing circuit 25 detects the fluctuation of the power supply voltage Vs in accordance with the voltage generated from the detected and measured power supply current Io by the current-voltage converter 24 and writes the optimal data to the memory 21 (FIG. 12) in the measured circuit 22 in accordance with the detection result.

In addition to the advantages of the third embodiment, the fourth embodiment has the following advantage.

The data generation circuit 15c does not have to be provided with the selection signal SL. Thus, in comparison with the data generation circuit 15b of the third embodiment, the data generation circuit 15c may be simplified.

In the fifth embodiment, the functions for adding the delay times of the first to third delay circuits 16a–16c of the second embodiment are added to the calculation processing circuit 25 of the setting circuit 31 employed in the fourth embodiment, which is shown in FIG. 13. The other parts are substantially the same as the power fluctuation inhibiting device of the fourth embodiment.

The setting circuit 31 of FIG. 13 in the fifth embodiment detects the difference in the timings of the rising of the load current I1 and the falling of the consumption current I2 in accordance with the output signal of the current-voltage converter. In accordance with the detection result, the calculation processing circuit 25 adjusts the selection signals SL1–SL3, which are provided to the first and third delay circuits 16a–16c in the measured circuit 22.

Figure 14A:
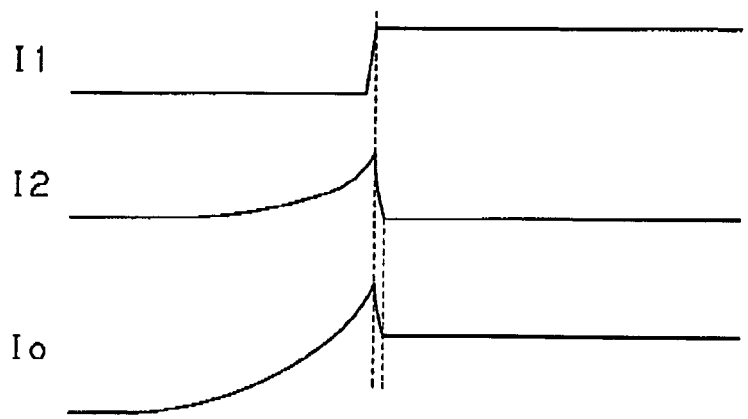
FIG. 14a–14c are waveform diagrams illustrating the relationship between the load current, the consumption current, and the power supply current.
Figure 14B:
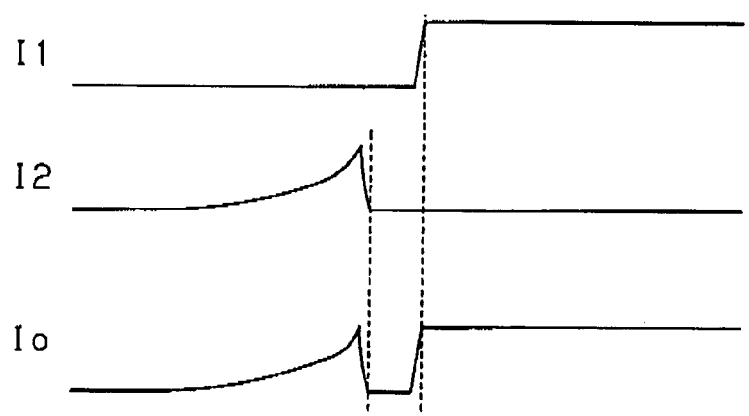

FIGS. 14a and 14b illustrate fluctuations in the power supply current Io caused by a difference between the timings of the load current I1 and the consumption current I2. As shown in FIG. 14a, when the falling of the consumption current I2 is delayed from the rising of the load current I1, the maximum value of the power supply current Io is the sum of the load current I1 and the consumption current I2, and the fluctuation of the power supply current Io is large.

As shown in FIG. 14b, when the falling of the consumption current I2 is earlier than the rising of the load current I1, the power supply current Io increases as the consumption current I2 increases and decreases as the consumption current I2 decreases. Further, the power supply current Io rises as the load current I1 rises. Accordingly, the fluctuation of the power supply current Io is large.

Figure 14C:
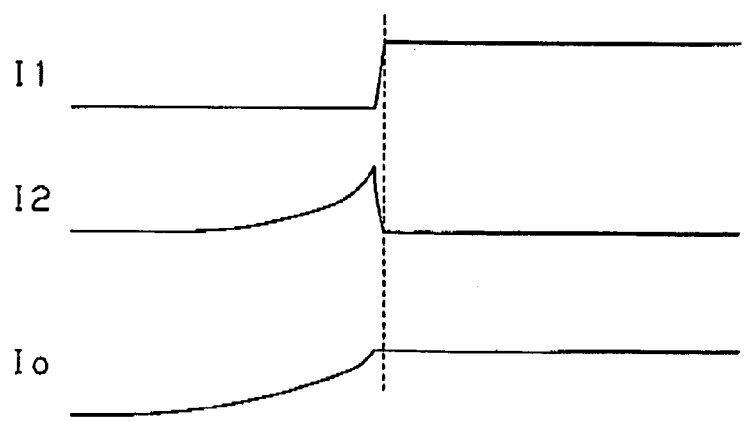

FIG. 14c illustrates a situation in which the falling of the consumption current I2 coincides with the rising of the load current I1. In this case, the power supply current Io becomes the constant current value of the load current I1 after the power supply current Io increases together with the consumption current I2. Accordingly, the fluctuation of the power supply current Io is small.

Figure 15:
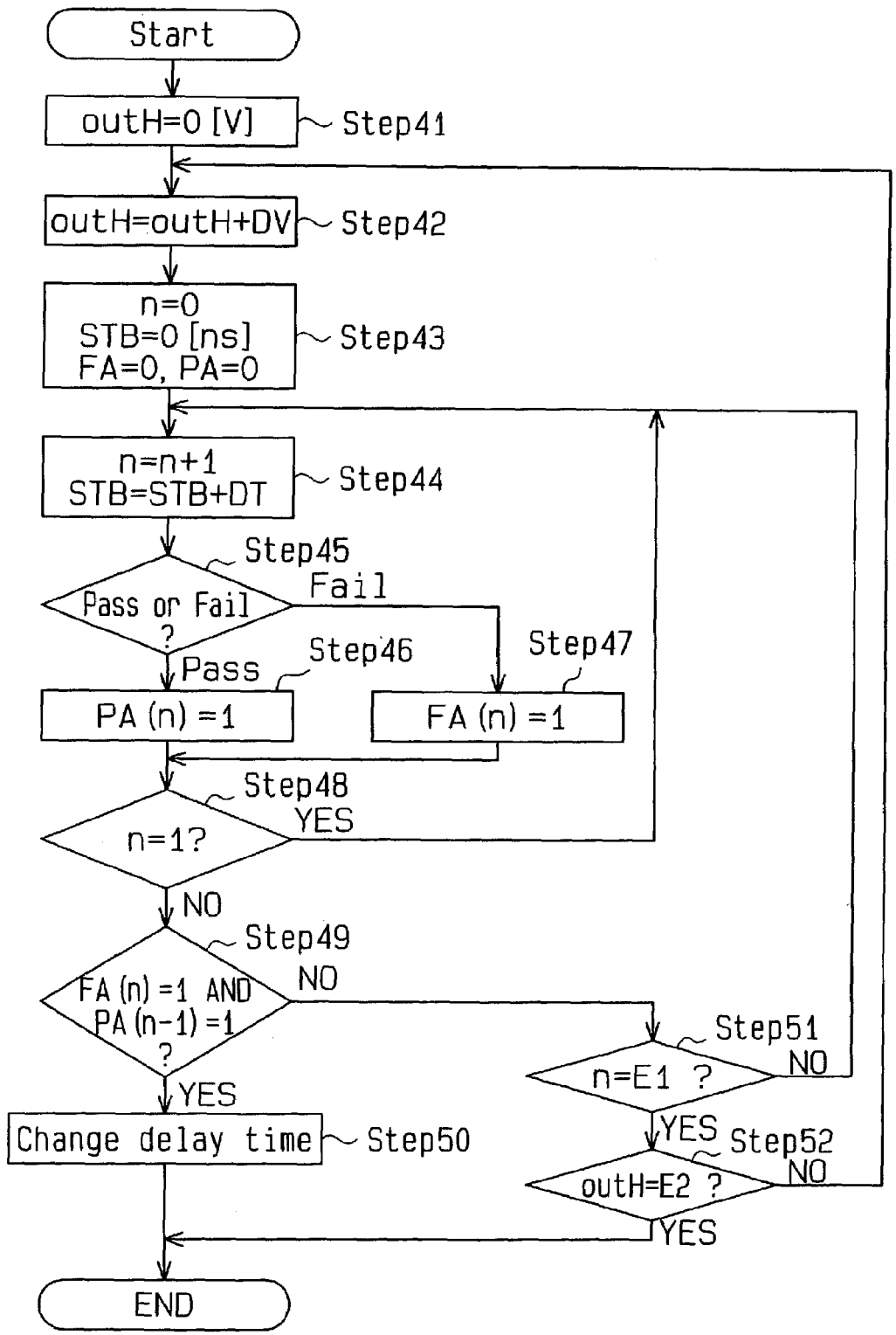
FIG. 15 is a flowchart illustrating the operation of a calculation circuit incorporated in a power fluctuation inhibiting device according to a fifth embodiment of the present invention.

The operation of the calculation processing circuit 25 in the fifth embodiment will now be discussed with reference to the flowchart shown in FIG. 15.

When starting the detection operation, the calculation processing circuit 25 first sets the threshold value outH at 0 v (step 41). The threshold value outH is set as a voltage value that is compared with a detection voltage Vd, which is generated by converting the power supply current Io to a voltage value.

Figure 16:
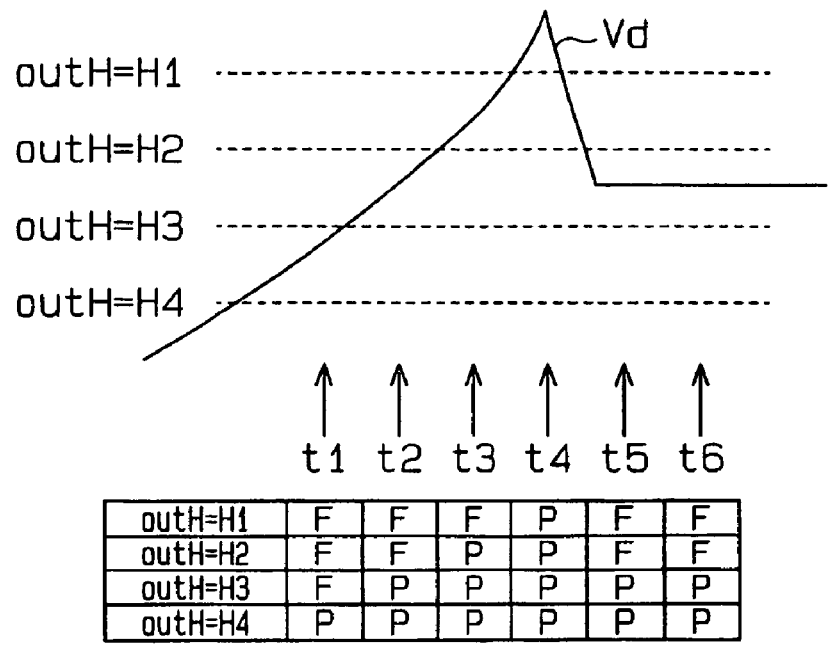
FIGS. 16 to 18 are explanatory diagrams illustrating the operation of the calculation circuit in the fifth embodiment.
Figure 17:
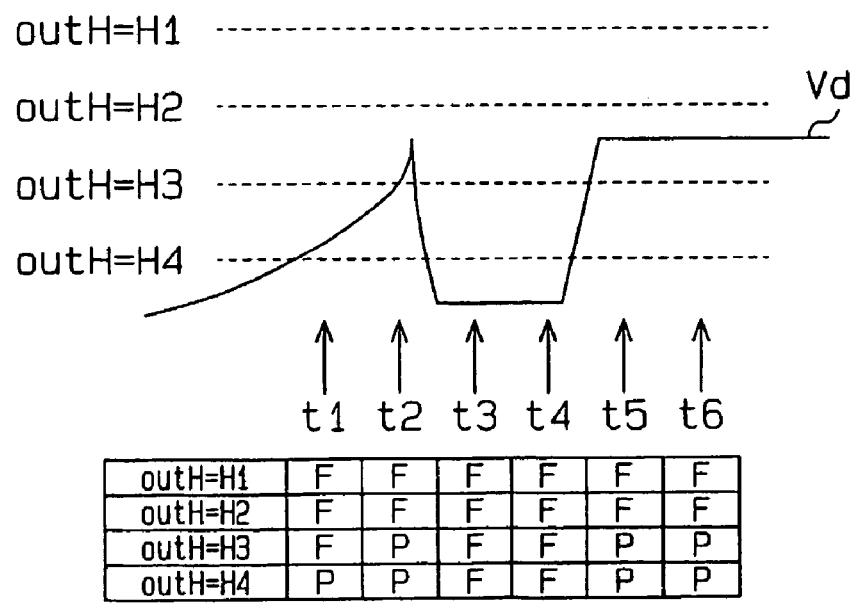
Figure 18:
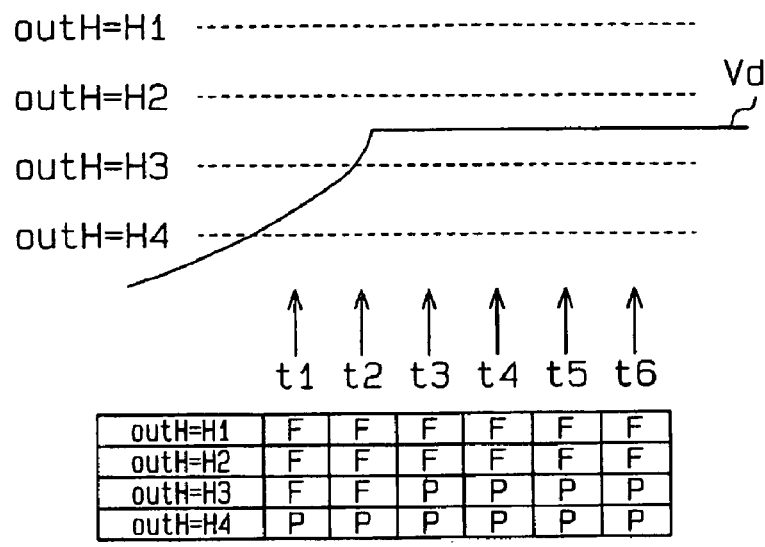

Then, the calculation processing circuit 25 adds a predetermined voltage DV to the threshold value outH (step 42). As a result, the threshold value outH becomes equal to level H4 as shown in FIGS. 16 to 18. The detection voltage Vd of FIG. 16 is generated by converting the power supply current of FIG. 14*a* to voltage.

The calculation processing circuit 25 sets a value n as "0", sets a strobe timing STB as "0ns", and sets a FAIL detection value FA and a PASS detection value PA as "0" (step 43).

For example, as shown at t1 to t6 in FIG. 16, the strobe timing STB sets the timing for retrieving the detection voltage Vd. The calculation processing circuit 25 compares the detection voltage Vd with the threshold value outH at strobe timings t1–t6 and gives a FAIL determination when the detection voltage Vd is less than the threshold value outH. When giving a FAIL determination, the calculation processing circuit 25 sets the FAIL detection value FA at "1". The calculation processing circuit 25 compares the detection voltage Vd with the threshold value outH and gives a PASS determination when the detection voltage Vd is greater than the threshold value outH. When giving a PASS determination, the calculation processing circuit 25 sets the PASS detection value PA at "1".

The calculation processing circuit 25 then adds "1" to the value n and sets a timing obtained by adding a predetermined time DT to the strobe timing STB (step 44). As a result, the strobe timing STB is set at, for example, t1, as shown in FIG. 16. Then, the calculation processing circuit 25 gives a PASS determination or a FAIL determination at STB=t1 (step 45).

At t1 in FIG. 16, the level of the detection voltage Vd is greater than the threshold value H4. Thus, the calculation processing circuit 25 gives a PASS determination and sets PA(1)=1 (step 46). At step 45, if the detection voltage Vd is less than the threshold voltage H4, the calculation processing circuit 25 gives a FAIL determination and sets "1" TO FA(1) (step 47) In FIGS. 16 to 18, PASS is represented by P and FAIL is represented by F.

The calculation processing circuit 25 determines whether or not the value n is 1 (step 48 ). In this state, the value n is 1. Thus, the calculation processing circuit 25 proceeds to step 44 and repeats steps 44 to 48.

When STB is t2, the calculation processing circuit 25 gives a PASS determination or a FAIL determination. Since the detection voltage Vd is greater than the threshold value H4, the calculation processing circuit 25 gives a PASS determination and sets "1" to PA(2).

At step 48, the value n is 2. Thus, the calculation processing circuit 25 proceeds to step 49. At step 49, the calculation processing circuit 25 detects whether FA(n) and PA(N−1) are both "1".

When outH is 4 and STB is t2, FA(2) is 0 and PA(1) is 1. Thus, the calculation processing circuit 25 proceeds to step 51. At step 51, the calculation processing circuit 25 determines whether the value n is equal to the final value E1. At FIG. 16, the final value E1 is "6". If the value n is not equal to the final value E1, the calculation processing circuit 25 returns to step 44 and repeats steps 44 to 49.

When the value n becomes equal to the final value E1, the calculation processing circuit 25 proceeds to step 52 and determines whether the threshold value outH is equal to the final value E2. At FIG. 16, the threshold value outH gives four types of determinations, which are H4 through H1, and the final value E2 is H1.

In this state, outH is H4. Thus, the calculation processing circuit 25 returns to step 42 and repeats steps 42–49 and 51. When outH is H1, the calculation processing circuit 25 ends the determination operation.

At the timings t1 to t6, the calculation processing circuit 25 gives the four types of determinations of H4 to H1.

At step 49, when FA(n) and PA(n−1) are both "1", the calculation processing circuit 25 proceeds to step 50. In FIG. 16, when outH=H2 and STB=t4, t5 are satisfied, FA(5)=1, PA(4)=1 are satisfied. Thus, the calculation processing circuit 25 proceeds step 50. That is, during the determinations at t1 to t6, when the determination result shifts from PASS to FAIL, the calculation processing circuit 25 determines that the fluctuation of the detected voltage Vd is large and that there is a difference between the timings of the rising of the load current I1 and the falling of the consumption current I2.

At step 50, the calculation processing circuit 25 adjusts the delay time of the first to third delay circuits 16*a* to 16*c* and ends the determination process. In the determination process, the difference between the rising of the load current I1 and the falling of the consumption current I2 is detected and the delay times of the first to third delay circuits 16*a* to 16*c* are adjusted to absorb the timing difference.

The detected voltage Vd shown in FIG. 17 is generated by converting the output current Io, which is shown in FIG. 14*b*, to voltage. When the detected voltage Vd undergoes the above determination process at outH=H3, H4, it is determined whether PASS has shifted to FAIL. In this case, the difference between the rising of the load current I1 and the falling of the consumption current I2 is detected. To absorb the difference between the timings, the delay times of the first to third delay circuits 16*a* to 16*c* are adjusted.

The detected voltage Vd shown in FIG. 18 is generated by converting the output current Io, which is shown in FIG. 14*c*, to voltage. When the detected voltage Vd undergoes the above determination process, PASS does not shift to FAIL. Accordingly, a difference between the timing of the rising of the load current I1 and the falling of the consumption current I2 is not detected. Thus., the shifting from step 49 to step 50 does not occur.

In addition to the advantages of the second and fourth embodiments, the power fluctuation inhibiting device has the following advantage.

The delay times of the first to third delay circuits 16*a* to 16*c* are adjusted in accordance with fluctuation of the power supply current Io.

Figure 19:
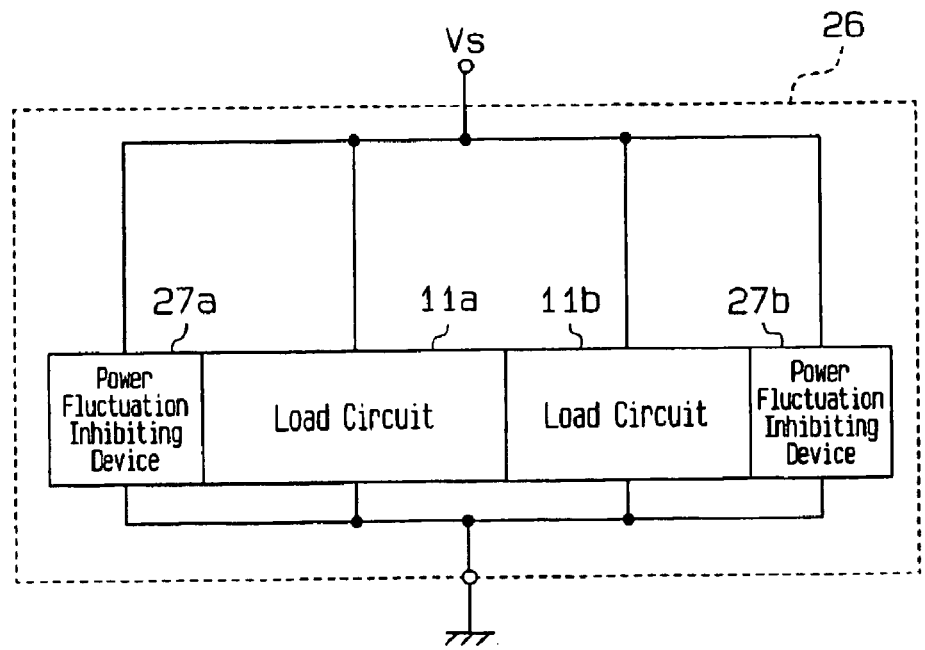
FIG. 19 is a schematic layout diagram of a semiconductor device according to a sixth embodiment of the present invention.

FIG. 19 is a schematic layout diagram of a semiconductor device 26 according to a sixth embodiment of the present invention. In FIG. 19, the other parts are substantially the same as the power fluctuation inhibiting device of the fourth embodiment. In the sixth embodiment, a plurality of load circuits are laid out at separated positions on a semiconductor device chip. The fluctuation of the power supply current due to the operation of each load circuit is adjusted for each load circuit.

The load circuits 11*a*, 11*b* are laid out on a semiconductor chip at separated positions. A power fluctuation inhibiting device 27*a* is laid out adjacent to the load circuit 11*a*, and a power fluctuation inhibiting device 27*b* is laid out adjacent to the load circuit 11*b*.

FIG. 20 is a schematic block circuit diagram of the power fluctuation inhibiting devices 27a, 27b. In FIG. 20, the other parts are substantially the same as the power fluctuation inhibiting device of the fourth embodiment. The load circuits 11a, 11b commonly use the same first and third delay circuits 16a, 16c and data generation circuit 15a. Further, the configuration of the first and third delay circuits 16a, 16c and the data generation circuit 15a is the same as in FIG. 8.

Second delay circuits 16d, 16e, which are connected to the first delay circuit 16a, D/A converters 14a, 14b, which are connected to the data generation circuit 15a, and current consumption circuits 13a, 13b, which are respectively connected to the D/A converters 14a, 14b, are respectively provided for each of the load circuits 11a, 11b.

The configuration and operation of the second delay circuits 16d, 16e, the D/A converters 14a, 14b, and the current consumption circuits 13a, 13b are the same as the corresponding second delay circuit 16b, D/A converter 14, and current consumption circuit 13 of FIG. 8.

In the sixth embodiment, the second delay circuits 16d, 16e, which provide the first activation signal AC11 to the associated load circuits 11a, 11b, may be arranged adjacent to the load circuits 11a, 11b.

Accordingly, the line capacitance of the delay circuits 16d, 16e and the load circuits 11a, 11b may be equalized so that the first activation signal AC11 is provided to the load circuits 11a, 11b at the same timing.

This also applies to the relationship between the load circuits 11a, 11b and the current consumption circuits 13a, 13b and the relationship between the D/A converters 14a, 14b and the current consumption circuits 13a, 13b.

In addition to the advantages of the second embodiment, the sixth embodiment has the advantages described below.

(1) The fluctuation of the power supply voltage Vs in the load circuits 11a, 11b is inhibited in a uniform manner in accordance with the same first and second activation signals AC11, AC12 even if the load circuits 11a, 11b are separated from each other.

(2) In comparison to when generating consumption current for multiple load circuits with a single current consumption circuit, the current capacitance and line capacitance of the load circuits 11a, 11b relative to the current consumption circuits 13a, 13b are decreased. Accordingly, the current drive capacity of each of the current consumption circuits 13a, 13b is decreased.

(3) Since the current drive capacity of the current consumption circuits 13a, 13b are decreased, the power supply voltage fluctuation, which is caused by the operation of the current consumption circuits 13a, 13b, is inhibited.

It should be apparent to those skilled in the art that the present invention may be embodied in many other specific forms without departing from the spirit or scope of the invention. Particularly, it should be understood that the present invention may be embodied in the following forms.

In the third embodiment, a large amount of data groups that are selected may be stored in the memory 19. By appropriately selecting the data groups, the maximum value B of the consumption current I2 may be optimized.

The configuration of the third embodiment may be added to the second embodiment.

The present examples and embodiments are to be considered as illustrative and not restrictive, and the invention is not to be limited to the details given herein, but may be modified within the scope and equivalence of the appended claims.

What is claimed is:

1. A device connected to a power supply and a load circuit to inhibit power supply voltage fluctuation that is caused by fluctuation of a load current generated by the load circuit, the device comprising:

a current consumption circuit connected to the power supply and the load circuit to generate a consumption current that flows parallel to the load current of the load circuit; and a current control circuit connected to the current consumption circuit to control the consumption current of the current consumption circuit in order to inhibit fluctuation of an output current of the power supply, which is the sum of the load current and the consumption current, when the load current rises and falls, and wherein the current control circuit includes, a data generation circuit for generating a digital signal that controls the consumption current of the current consumption circuit in order to inhibit fluctuation of the output current of the power supply, and a D/A converter connected to the data generation circuit and the current consumption circuit to convert the digital signal to an analog signal and provide the analog signal to the current consumption circuit, wherein the current control circuit receives a first activation signal for controlling the rising and falling of the load current, a second activation signal provided before the first activation signal, and a clock signal, and wherein the current control circuit generates the digital signal for causing the consumption current to gradually rise by performing an adding operation with the second activation signal and the clock signal, the digital signal for causing the consumption current to fall in synchronism with the rising of the load current in accordance with the first activation signal, and the digital signal for causing the consumption current to gradually fall by performing a subtracting operation with the clock signal.

2. The device according to claim 1, wherein the current control circuit causes the consumption current to fall in synchronism with the rising of the load current and causes the consumption current to rise in synchronism with the falling of the load current.

3. A device connected to a power supply and a load circuit to inhibit power supply voltage fluctuation that is caused by fluctuation of a load current generated by the load circuit, the device comprising:

a current consumption circuit connected to the power supply and the load circuit to generate a consumption current that flows parallel to the load current of the load circuit;

a data generation circuit for generating a digital signal that controls the consumption current of the current consumption circuit in order to inhibit fluctuation of an output current of the power supply, which is the sum of the load current and the consumption current, when the load current rises and when the consumption current falls; and a D/A converter connected to the data generation circuit and the current consumption circuit to convert the digital signal to an analog signal and provide the analog signal to the current consumption circuit, wherein the data generation circuit receives a first activation signal for controlling the rising and falling of the load current, a second activation signal provided before the first activation signal, and a clock signal, and wherein the data generation circuit generates the digital signal for causing the consumption current to gradually rise by performing an adding operation with the second activation signal and the clock signal, the digital signal for causing the consumption current to fall in synchronism with the rising of the load current in accordance with the first activation signal, and the digital signal for causing the consumption current to gradually fall by performing a subtracting operation with the clock signal.

4. The device according to claim 3, wherein the data generation circuit generates the digital signal for causing the consumption current to fall in synchronism with the rising of the load current.

5. The device according to claim 3, wherein the data generation circuit generates the digital signal for causing a rise in the consumption current in synchronism with a fall in the load current.

6. The device according to claim 3, wherein the data generation circuit generates the digital signal for causing the consumption current to fall in synchronism with the rising of the load current, and generates the digital signal for causing a rise in the consumption current in synchronism with a fall in the load current.

7. The device according to claim 3, further comprising:
a first delay circuit connected to the data generation circuit to delay the first activation signal and provide the data generation circuit with a first delayed activation signal;
a second delay circuit connected to the first delay circuit to further delay the first delayed activation signal and provide the load circuit with a second delayed activation signal; and
a third delay circuit connected to the data generation circuit to delay the second activation signal and provide the data generation circuit with a delayed second activation signal, wherein the delay time of each of the first to third delay circuits is variable.

8. The device according to claim 3, further comprising:
a memory connected to the data generation circuit to store data used to generate the consumption current, and wherein the data generation circuit reads the data stored in the memory in accordance with the clock signal, the first activation signal, and the second activation signal and generates the digital signal using the read data.

9. The device according to claim 8, wherein the memory stores a plurality of data groups corresponding to a current value of the load current, and wherein the data generation circuit selects one of the data groups and reads the selected data group from the memory.

10. The device according to claim 8, further comprising:
a data setting circuit connected to the memory to write the data groups, wherein the data setting circuit detects fluctuation of the output current of the power supply and generates the data groups in accordance with the detection result.

11. The device according to claim 10, further comprising:
a first delay circuit connected to the data generation circuit and the data setting circuit to delay the first activation signal and provide the data generation circuit with a first delayed activation signal;
a second delay circuit connected to the first delay circuit and the data setting circuit to further delay the first delayed activation signal and provide the load circuit with a second delayed activation signal; and
a third delay circuit connected to the data generation circuit and the data setting circuit to delay the second activation signal and provide the data generation circuit with the delayed second activation signal;
wherein the delay time of each of the first to third delay circuits is variable, and wherein each of the first, second, and third delay circuits varies the delay time in accordance with the detection result.

12. A semiconductor device comprising:
a plurality of load circuits; and
a plurality of power fluctuation inhibiting devices, each connected to an associated one of the load circuits to inhibit power supply voltage fluctuation that is caused by fluctuation of a load current generated by the associated load circuit, wherein each of the power fluctuation inhibiting devices includes;
a current consumption circuit connected parallel to the associated load circuit and arranged near the load circuit to generate a consumption current that flows parallel to a load current generated by the associated load circuit; and
a current control circuit connected to the current consumption circuit to control the consumption current of the current consumption circuit in order to inhibit fluctuation of an output current of the power supply, which is the sum of the load current and the consumption current, when the load current rises and falls, and wherein the current control circuit generates a digital signal that causes the consumption current to fall in synchronism with the rising of the load current and causes the consumption current to rise in synchronism with the falling of the load current,
wherein the current control circuit receives a first activation signal for controlling the rising and falling of the load current, a second activation signal provided before the first activation signal, and a clock signal, and wherein the current control circuit generates the digital signal for causing the consumption current to gradually rise by performing an adding operation with the second activation signal and the clock signal, the digital signal for causing the consumption current to fall in synchronism with the rising of the load current in accordance with the first activation signal, and the digital signal for causing the consumption current to gradually fall by performing a subtracting operation with the clock signal.

13. A semiconductor device comprising:
a plurality of load circuits; and
a plurality of power fluctuation inhibiting devices, each connected to an associated one of the load circuits to inhibit power supply voltage fluctuation that is caused by fluctuation of a load current generated by the associated load circuit, wherein each of the power fluctuation inhibiting devices includes;
a current consumption circuit connected parallel to the associated load circuit and arranged near the load circuit to generate a consumption current that flows parallel to a load current generated by the associated load circuit; and
a data generation circuit used commonly by the power fluctuation inhibiting devices to generate a digital signal that controls the current consumption circuit in order to inhibit fluctuation of an output current of the power supply when the load current rises and falls; and
a D/A converter connected to the data generation circuit and the current consumption circuit to convert the digital signal to an analog signal and provide the analog signal to the associated current consumption circuit, wherein the data generation circuit generates the digital signal for causing the consumption current to fall in synchronism with the rising of the load current, and generates the digital signal for causing the consumption current to rise in synchronism with the falling of the load current, wherein the data generation circuit receives a first activation signal for controlling the rising and falling of the load current, a second activation signal provided before the first activation signal, and a clock signal, and wherein the data generation circuit generates the digital signal for causing the consumption current to gradually rise by performing an adding operation with the second activation signal and the clock signal, the digital signal for causing the consumption current to fall in synchronism with the rising of the load current in accordance with the first activation signal, and the digital signal for causing the consumption current to gradually fall by performing a subtracting operation with the clock signal.

14. The semiconductor device according to claim 13, wherein the data generation circuit receives a first activation signal for controlling the rising and falling of the load current, a second activation signal provided before the first activation signal, and a clock signal, and wherein the data generation circuit generates the digital signal for causing the consumption current to gradually rise by performing an adding operation on the digital signal in accordance with the second activation signal and the clock signal, for causing the consumption current to fall in synchronism with the rising of the load current on activation of the first activation signal, for causing the consumption current to rise when the data generation circuit stops receiving the second activation signal, and for causing the consumption current to gradually fall by performing a subtracting operation on the digital signal in accordance with the clock signal.

15. The semiconductor device according to claim 14, further comprising:
a first delay circuit connected to the data generation circuit to delay the first activation signal and provide the data generation circuit with a first delayed activation signal;
a second delay circuit connected to the first delay circuit to further delay the first delayed activation signal and provide the associated load circuit with a second delayed activation signal; and
a third delay circuit connected to the data generation circuit to delay the second activation signal and provide the data generation circuit with the delayed second activation signal, wherein the delay time of each of the first to third delay circuits is variable.

16. A method for inhibiting power supply voltage fluctuation that is caused by fluctuation of a load current generated by a load circuit, wherein the load circuit is connected to a current consumption circuit for generating a consumption current that flows parallel to the load current of the load circuit, the method comprising the steps of:
storing data for controlling the consumption current in a memory;
reading the data from the memory in accordance with a clock signal to generate a digital signal with the read data;
converting the digital signal to an analog signal;
causing the consumption current of the current consumption circuit to gradually rise in accordance with the analog signal before the load current of the load circuit rises;
causing the consumption current to fall in synchronism with the rising of the load current;
causing the consumption current to rise in synchronism with the falling of the load current; and
causing the consumption current to gradually fall with the analog signal;
causing the consumption current of the current consumption circuit to gradually rise before the load current of the load circuit rises;
causing the consumption current to fall in synchronism with the rising of the load current;
causing the consumption current to rise in synchronism with the falling of the load current; and
causing the consumption current to gradually fall in accordance with the analog signal.

17. A method for inhibiting power supply voltage fluctuation that is caused by fluctuation of a load current generated by a load circuit, wherein the load circuit is connected to a current consumption circuit for generating a consumption current that flows parallel to the load current of the load circuit, the method comprising the steps of:
generating a first digital signal by performing an adding operation with a clock signal;
converting the first digital signal to a first analog signal;
generating a second digital signal by performing a subtracting operation with the clock signal;
converting the second digital signal to a second analog signal;
causing the consumption current of the current consumption circuit to gradually rise before the load current of the load circuit rises by controlling the current consumption circuit with the first analog signal;
causing the consumption current to fall in synchronism with the rising of the load current;
causing the consumption current to rise in synchronism with the falling of the load current; and
causing the consumption current to gradually fall by controlling the current consumption circuit with the second analog signal.

18. The method according to claim 16, further comprising the steps of:
detecting fluctuation of an output current of the power supply;
adjusting the timings of the rising of the load current and the falling of the consumption current, and the timings of the falling of the load current and the rising of the consumption current, in accordance with the detection result.

* * * * *